US009798635B2

(12) United States Patent
Harper et al.

(10) Patent No.: US 9,798,635 B2
(45) Date of Patent: Oct. 24, 2017

(54) SERVICE LEVEL AGREEMENT-BASED RESOURCE ALLOCATION FOR FAILURE RECOVERY

(71) Applicant: International Business Machines Corporation, Armonk, NY (US)

(72) Inventors: Richard E. Harper, Chapel Hill, NC (US); Valentina Salapura, Chappaqua, NY (US); Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/966,347

(22) Filed: Dec. 11, 2015

(65) Prior Publication Data
US 2017/0168907 A1    Jun. 15, 2017

(51) Int. Cl.
*G06F 11/16* (2006.01)
*G06F 11/20* (2006.01)
*G06F 9/50* (2006.01)

(52) U.S. Cl.
CPC ........ *G06F 11/2033* (2013.01); *G06F 9/5005* (2013.01); *G06F 2201/805* (2013.01)

(58) Field of Classification Search
USPC ....................................................... 714/4.12
See application file for complete search history.

(56) References Cited

U.S. PATENT DOCUMENTS

| | | |
|---|---|---|
| 8,762,339 B2 | 6/2014 | Bartholomy et al. |
| 8,977,886 B2 | 3/2015 | Bauer et al. |
| 9,009,542 B1* | 4/2015 | Marr ................... G06F 11/3006 714/47.1 |
| 2003/0187970 A1* | 10/2003 | Chase ................... G06Q 10/06 709/223 |
| 2009/0265568 A1* | 10/2009 | Jackson ................ G06F 1/3203 713/320 |

(Continued)

FOREIGN PATENT DOCUMENTS

CN        101790170 A        7/2010

OTHER PUBLICATIONS

Bianco et al., "Optimal Resource Allocation for Disaster Recovery," Global Telecommunications Conference (Globecom 2010), Dec. 6-10, 2010, 5 pages.

(Continued)

*Primary Examiner* — Kamini Patel
(74) *Attorney, Agent, or Firm* — Yee & Associates, P.C.; Louis J. Percello

(57) ABSTRACT

Allocating resources during failure recovery is provided. A set of one or more service level agreement tiers are identified corresponding to a client workload that was being processed by a failed computing environment. A highest level tier is selected in the set of one or more service level agreement tiers. Recovery resources are allocated in a failover computing environment to the highest level tier sufficient to meet a service level agreement associated with the highest level tier. The highest level tier is recovered in the set of one or more service level agreement tiers using the recovery resources in the failover computing environment. In response to recovering the highest level tier, tier resources of the highest level tier are reduced to a steady state level of processing in the failover computing environment.

20 Claims, 12 Drawing Sheets

(56) References Cited

U.S. PATENT DOCUMENTS

| | | | | |
|---|---|---|---|---|
| 2010/0162257 A1* | 6/2010 | Hiltunen | ............... | G06F 9/50 718/104 |
| 2012/0136833 A1* | 5/2012 | Bartholomy | ........ | G06F 11/2028 707/644 |
| 2013/0132561 A1* | 5/2013 | Pasala | ............... | H04L 67/1097 709/224 |
| 2013/0185667 A1* | 7/2013 | Harper | ............... | G06F 11/0709 715/772 |
| 2013/0212422 A1* | 8/2013 | Bauer | ............... | H04L 67/1097 714/4.1 |
| 2013/0227116 A1* | 8/2013 | Radhakrishnan | ... | H04L 41/0823 709/224 |
| 2014/0032959 A1* | 1/2014 | Dawkins | ............ | G06F 11/2048 714/6.3 |
| 2014/0040474 A1* | 2/2014 | Blagodurov | ........ | G06F 9/5088 709/226 |
| 2015/0039764 A1* | 2/2015 | Beloglazov | ............ | H04L 47/70 709/226 |
| 2015/0113540 A1* | 4/2015 | Rabinovici | ........ | G06F 9/5011 718/104 |

OTHER PUBLICATIONS

Arora et al., "Optimizing Regional Aid During Public Health Emergencies: An Autonomic Resource Allocation Approach," HICSS '07 Proceedings of the 40th Annual Hawaii International Conference on System Sciences—2007, Jan. 3-6, 2007, 9 pages.

Mell et al., "The NIST Definition of Cloud Computing," National Institute of Standards and Technology Special Publication 800-145, Sep. 2011, 7 pages.

Arora et al., "Resource Allocation for Demand Surge Mitigation During Disaster Response," Decision Support Systems, vol. 50, No. 1, Dec. 2010, pp. 304-315 (abstract only).

* cited by examiner

| SLA TIERS | CRITICAL TIER | ESSENTIAL TIER | ROUTINE TIER | NON-ESSENTIAL TIER |
|---|---|---|---|---|
| BUSINESS FUNCTION CHARACTERISTICS | • MISSION CRITICAL<br>• VERY HIGH IMPACT TO REVENUE AND COMPLIANCE POSTURE<br>• VERY HIGH IMPACT TO REPUTATION OR BRAND<br>• TOP 5-10% OF BUSINESS APPS | • BUSINESS CRITICAL<br>• HIGH IMPACT TO REVENUE AND COMPLIANCE POSTURE<br>• HIGH IMPACT TO REPUTATION OR BRAND | BACK-OFFICE FUNCTIONS | NON-CRITICAL, BACK-END, OFFLINE BUSINESS FUNCTIONS |
| AVAILABILITY REQUIREMENTS | >99.999% AVAILABILITY<br>CONTINUOUS AVAILABILITY | >99.99% AVAILABILITY<br>NEAR-CONTINOUS AVAILABILITY | >99.9% AVAILABILITY<br>HIGH AVAILABILITY | 99.5% OR LOWER AVAILABILITY<br>MODERATE OR BEST EFFORT AVAILABILITY |
| RECOVERABILITY REQUIREMENTS | <5.26 MINUTES PER YEAR DOWNTIME | <52.56 MINUTES PER YEAR DOWNTIME | <8.76 HOURS PER YEAR DOWNTIME | >1.83 DAYS PER YEAR DOWNTIME |

SLA TIER CHART 600

FIG. 6

SERVICE LEVEL AGREEMENT-BASED RESOURCE ALLOCATION FOR FAILURE RECOVERY

BACKGROUND

1. Field

The disclosure relates generally to failure recovery and more specifically to using multi-tiered service level agreement resource allocation to recover a failed client workload on a failover computing environment.

2. Description of the Related Art

To achieve high availability and disaster recovery of a computing environment, client workloads need to be monitored. In the event of a failure, whether a local failure or a disaster, the client workload on a failed computing environment must be restarted on a failover computing environment.

SUMMARY

According to one illustrative embodiment, a computer-implemented method for allocating resources during failure recovery is provided. A computer identifies a set of one or more service level agreement tiers corresponding to a client workload that was being processed by a failed computing environment. The computer selects a highest level tier in the set of one or more service level agreement tiers corresponding to the client workload. The computer allocates recovery resources in a failover computing environment to the highest level tier in the set of one or more service level agreement tiers corresponding to the client workload sufficient to meet a service level agreement associated with the highest level tier. The computer recovers the highest level tier in the set of one or more service level agreement tiers corresponding to the client workload using the recovery resources in the failover computing environment sufficient to meet the service level agreement associated with the highest level tier. In response to the computer recovering the highest level tier, the computer reduces tier resources of the highest level tier in the set of one or more service level agreement tiers corresponding to the client workload to a steady state level of processing in the failover computing environment and provides those tier resources to a next highest level tier. According to other illustrative embodiments, a computer system and computer program product for allocating resources during failure recovery are provided.

BRIEF DESCRIPTION OF THE DRAWINGS

FIG. 6 is an example of a service level agreement tier chart in accordance with an illustrative embodiment;

DETAILED DESCRIPTION

Figure 1:
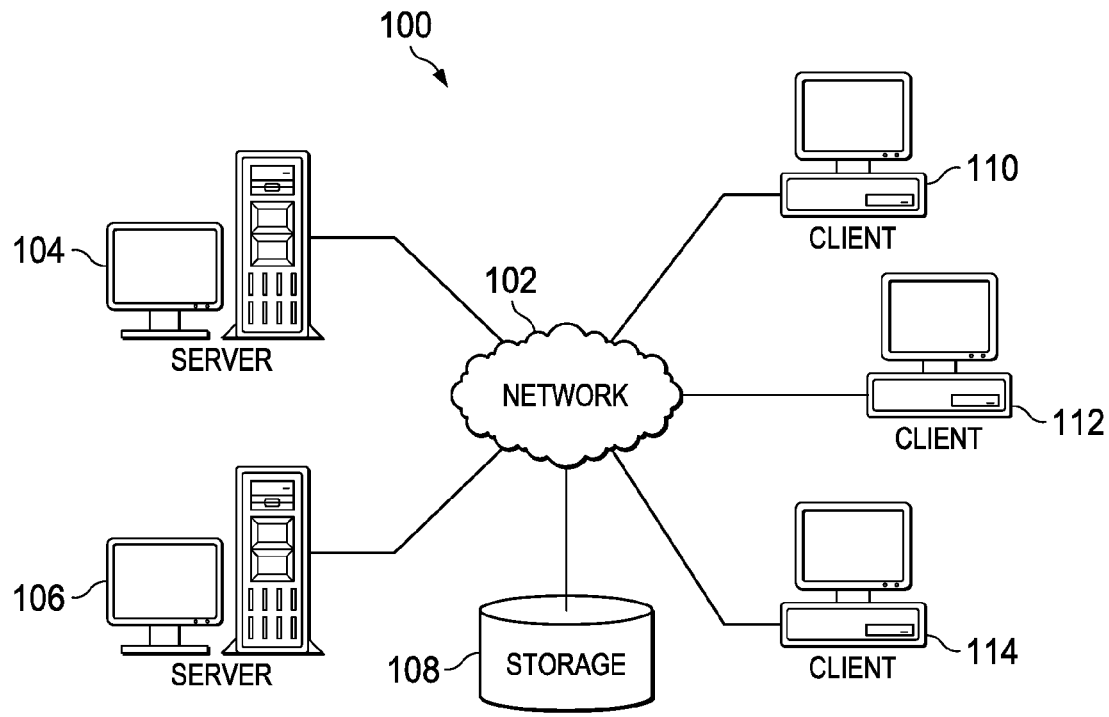
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a client workload after failure of a computing environment executing the client workload. The failed computing environment may be, for example, a server or a set of servers in a data center environment or a cloud environment. Server 104 or server 106 may manage recovery of the client workload by migrating the client workload to a target failover computing environment, such as another server or set of servers in the same data center or cloud or a different data center or cloud. Server 104 or server 106 also may allocate resources within the target failover computing environment based on a service level agreement, which may include a hierarchy of multiple tier levels, corresponding to the client workload.

A service level agreement (SLA) is a contract that defines a service provided by a service provider. Particular aspects of the service, such as, for example, scope, quality, and responsibilities, are agreed on between the service provider and the service consumer. The service level agreement defines the level of service expected by the service consumer from the service provider. This is specified as the maximum acceptable outage (equivalent to the maximum Recovery Time) allowable for that tier.

Client 110, client 112, and client 114 also connect to network 102. Clients 110, 112, and 114 are clients of server 104 and server 106. Server 104 and server 106 may provide information, such as boot files, operating system images, virtual machine images, and software applications to clients 110, 112, and 114.

In this example, clients 110, 112, and 114 may each represent a different computing environment. A computing environment includes physical resources used to host and execute operating system instances to perform a set of one or more workloads or tasks for service consumers. A computing environment may comprise, for example, one server, a rack of servers, a cluster of servers, such as a data center, a cloud of computers, such as a private cloud, a public cloud, or a hybrid cloud, or any combination thereof. However, it should be noted that clients 110, 112, and 114 are intended as examples only. In other words, clients 110, 112, and 114 may include other types of data processing systems, such as, for example, network computers, desktop computers, laptop computers, tablet computers, handheld computers, smart phones, personal digital assistants, and gaming devices.

Storage 108 is a network storage device capable of storing any type of data in a structured format or an unstructured format. The type of data stored in storage 108 may be, for example, resource allocation managers, lists of computing environments with corresponding available resources, and lists of client workloads with corresponding operating system instances and service level agreements. Further, storage unit 108 may store other types of data, such as authentication or credential data that may include user names, passwords, and biometric data associated with system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
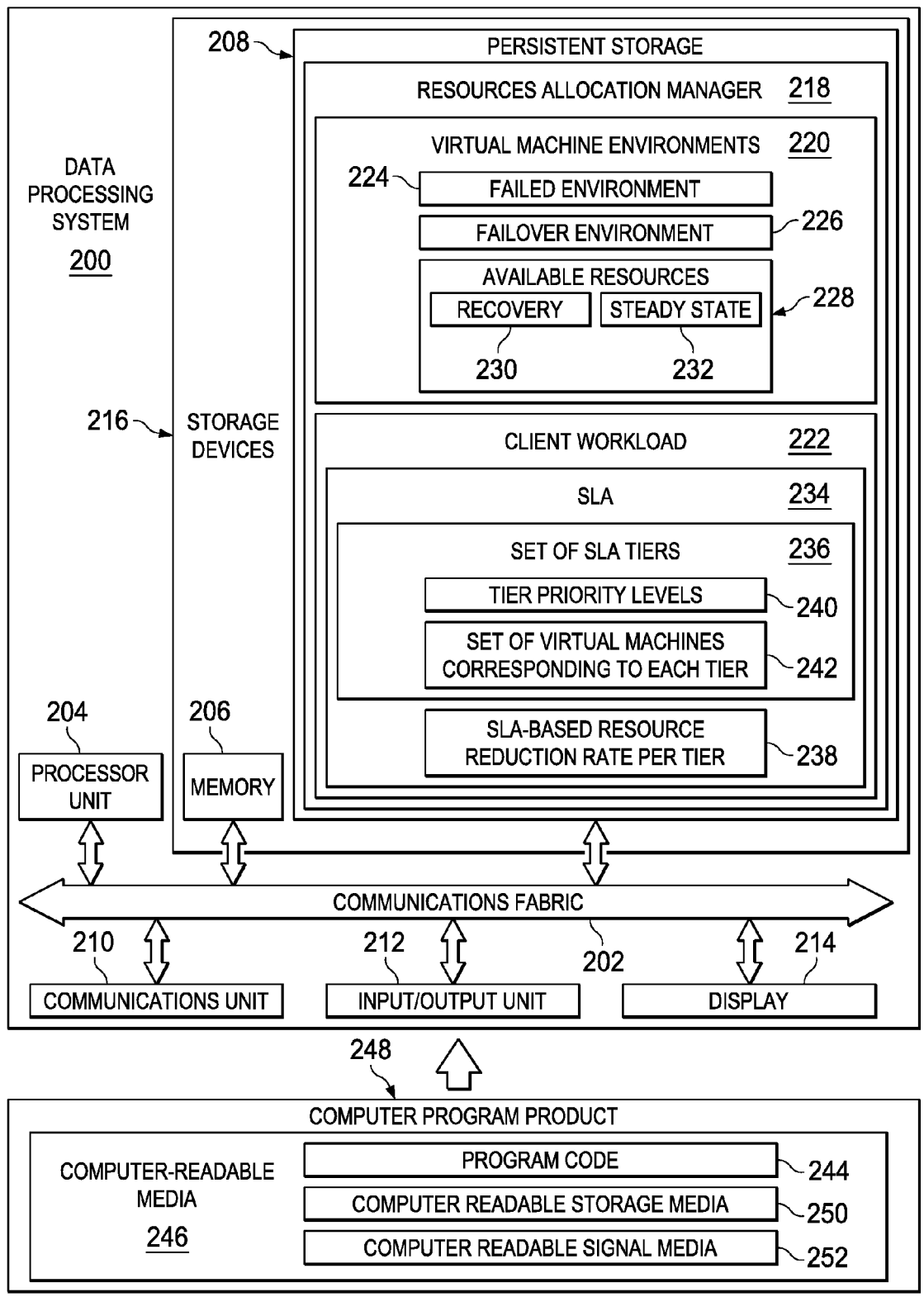
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores resource allocation manager 218. Resource allocation manager 218 monitors computing environments for failure and, in response to detecting a failure, determines which client workloads need to be migrated to a set of one or more target failover computing environments. After determining which client workloads require migration, resource allocation manager 218 migrates the client workloads to the set of one or more target failover computing environments based on service level agreements corresponding to each respective client workload that needs to be migrated. For example, a particular service level agreement may direct resource allocation manager 218 to allocate available resources to virtual machines in a target failover virtual machine environment based on a hierarchy of multiple tier levels corresponding to a particular client workload. Henceforth the term "virtual machine environment" shall be used as an example of a "computing environment" without loss of generality. The target failover virtual machine environment may be, for example, client 112 in FIG. 1. Also, it should be noted that even though resource allocation manager 218 is illustrated as residing in persistent storage 208, in an alternative illustrative embodiment resource allocation manager 218 may be a separate component of data processing system 200. For example, resource allocation manager 218 may be a hardware component coupled to communication fabric 202 or a combination of hardware and software components.

In this example, resource allocation manager 218 includes virtual machine environments 220 and client workloads 222. Virtual machine environments 220 represent a list of different virtual machine environments that are each capable of executing a set of one or more client workloads. Resource allocation manager 218 monitors virtual machine environments 220 for failures. Client workload 222 represents a workload of a client that is executing in one or more of virtual machine environments 220. It should be noted that client workload 222 may represent a list of a plurality of different client workloads executing in virtual machine environments 220.

In this example, virtual machine environments 220 include failed environment 224 and failover environment 226. Failed virtual environment 224 represents a virtual machine environment that has failed while executing client workload 222. Failover environment 226 represents a virtual machine environment that resource allocation manager 218 will migrate client workload 222 to as a result of the failure in failed virtual environment 224. In this example, failover environment 226 includes available resources 228. Available resources 228 represent a set of one or more resources, such as, for example, central processor unit resources, memory resources, storage resources, network bandwidth resources, and/or storage bandwidth resources, which is available in failover environment 226 to recover client workload 222 on failover environment 226.

Available resources 228 include those required for timely recovery 230 and those required for steady state operation after recovery has completed 232. Recovery 230 represents a set of one or more recovery resources that failover environment 226 requires to recover client workload 222 on failover environment 226 above a number of resources that may be required to process client workload 222 at a steady state level after recovery. In other words, at recovery time, the resource requirements of client workload 222 may significantly exceed the number of resources needed for steady state processing of client workload 222. Steady state 232 represents a number of resources in failover environment 226 required to process client workload 222 at a steady state level after recovery has completed.

Also in this example, client workload 222 includes service level agreement 234. Service level agreement 234 represents the level of service that virtual machine environments 220 are to provide to client workload 222. Service level agreement 234 includes set of service level agreement tiers 236 and service level agreement-based resource reduction rate per tier 238. Set of service level agreement tiers 236 represents a set of one or more tiers of service that virtual machine environments 220 provide to client workload 222.

In this example, set of service level agreement tiers 236 includes tier priority levels 240 and set of virtual machines corresponding to each tier 242. Tier priority levels 240 represent a hierarchy of priority tiers corresponding to client workload 222. Tier priority levels 240 may include, for example, tier priority levels, such as a critical priority tier, an essential priority tier, a routine priority tier, and a non-essential priority tier. The critical priority tier may represent a highest level priority tier, the essential priority tier may represent a next highest level priority tier, the routine priority tier may represent a next highest level priority tier, and the non-essential priority tier may represent a lowest level priority tier. Each tier is associated with a Recovery Time Objective, with each more critical tier having a Recovery Time Objective that is smaller than the less critical tier. However, it should be noted that illustrative embodiments are not limited to such. For example, alternative illustrative embodiments may include more or fewer service level agreement tiers.

Set of virtual machines corresponding to each tier 242 represents a set of one or more virtual machines that execute a portion of client workload 222 corresponding to a particular service level agreement tier in set of service level agreement tiers 236. In other words, each particular service level agreement tier in set of service level agreement tiers 236 has a corresponding set of one or more virtual machines that execute a particular portion of client workload 222. Thus, resource allocation manager 218 may recover a set of virtual machines corresponding to a higher level tier of client workload 222 prior to recovering virtual machines corresponding to lower level tiers of client workload 222.

Further, resource allocation manager 218 may reduce the number of steady state resources allocated to client workload 222 using service level agreement-based resource reduction rate per tier 238. Service level agreement-based resource reduction rate per tier 238 represents the number of resources that resource allocation manager 218 will reduce to client workload 222 at each particular service level agreement tier of service level agreement tiers 236 when a total amount of available resources 228 in failover environment 226 are not sufficient to process client workload 222. For example, resource allocation manager 218, in response to determining that insufficient resources exist in failover environment 226 to process client workload 222, may reduce resources to a critical service level agreement tier of client workload 222 by 0-5%, reduce resources to an essential service level agreement tier of client workload 222 by 5-10%, reduce resources to a routine service level agreement tier of client workload 222 by 10-20%, and reduce resources to a non-essential service level agreement tier by 20-30%.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It should be understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the provider of the service. Broad network access provides for capabilities that are available over a network and accessed through standard mechanisms, which promotes use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
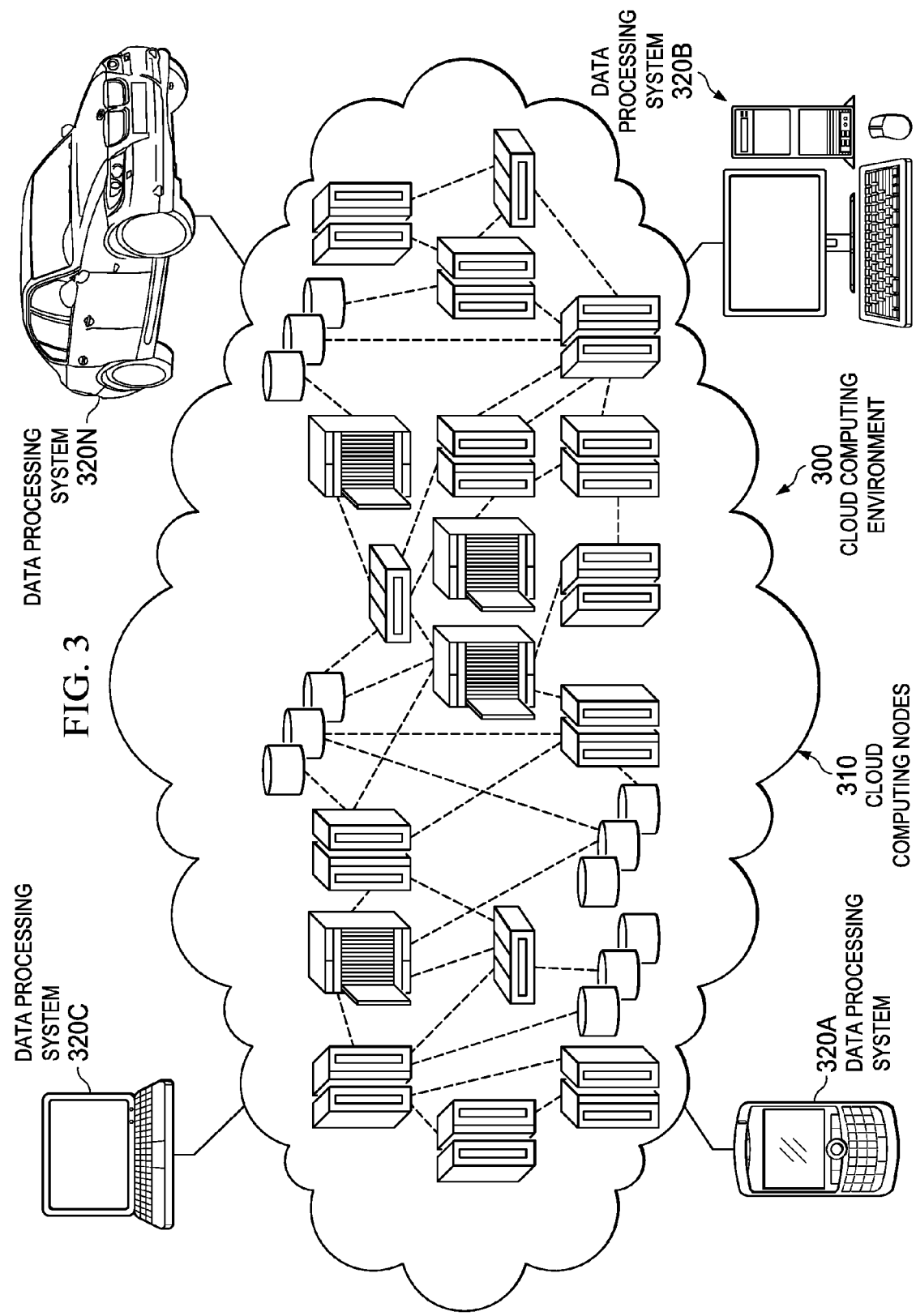
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local data processing systems used by cloud consumers may communicate. Cloud computing nodes 310 may be, for example, server 104 and server 106 in FIG. 1. Local data processing systems that communicate with cloud computing nodes 310 include data processing system 320A, which may be a personal digital assistant or a smart phone, data processing system 320B, which may be a desktop computer or a network computer, data processing system 320C, which may be a laptop computer, and data processing system 320N, which may be a computer system of an automobile. Data processing systems 320A-320N may be, for example, clients 110-114 in FIG. 1.

Cloud computing nodes 310 may communicate with one another and may be grouped physically or virtually into one or more cloud computing networks, such as a private cloud computing network, a community cloud computing network, a public cloud computing network, or a hybrid cloud computing network. This allows cloud computing environment 300 to offer infrastructure, platforms, and/or software as services without requiring the cloud consumers to maintain these resources on their local data processing systems, such as data processing systems 320A-320N. It is understood that the types of data processing devices 320A-320N are intended to be examples only and that cloud computing nodes 310 and cloud computing environment 300 can communicate with any type of computerized device over any type of network and/or network addressable connection using a web browser, for example.

Figure 4:
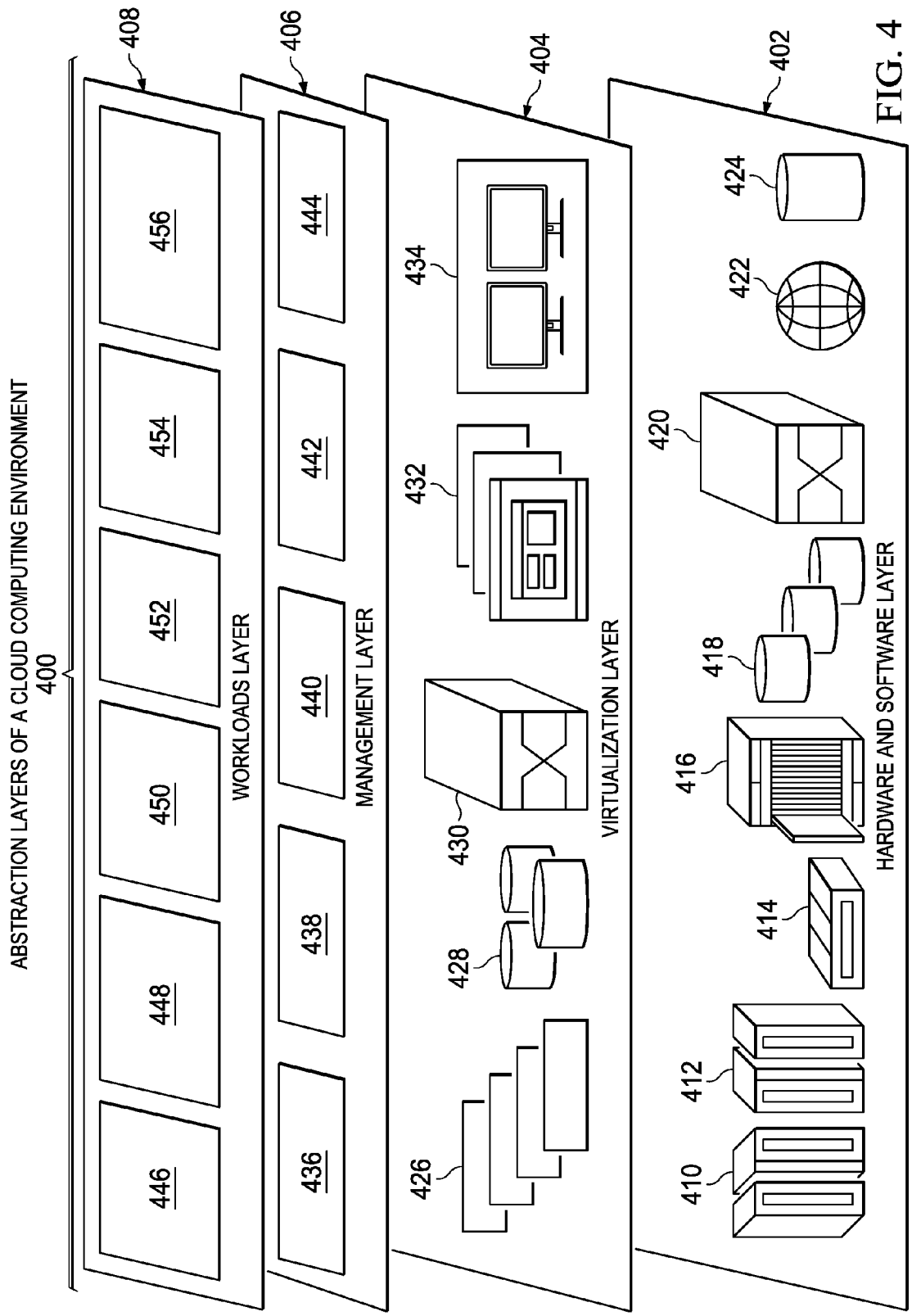
FIG. 4 is a diagram illustrating an example of abstraction layers of a cloud computing environment in accordance with an illustrative embodiment.

With reference now to FIG. 4, a diagram illustrating an example of abstraction layers of a cloud computing environment is depicted in accordance with an illustrative embodiment. The set of functional abstraction layers shown in this illustrative example may be implemented in a cloud computing environment, such as cloud computing environment 300 in FIG. 3. Also, it should be noted that the layers, components, and functions shown in FIG. 4 are intended to be examples only and not intended to be limitations on illustrative embodiments.

In this example, abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430 including virtual private networks; virtual applications and operating systems 432; and virtual machines 434.

Management layer 406 may provide a plurality of different management functions, such as, for example, resource provisioning 436, metering and pricing 438, security and user portal 440, service level management 442, and virtual machine environment management 444. Resource provisioning 436 dynamically procures computing resources and other resources, which are utilized to perform workloads or tasks within the cloud computing environment. Metering and pricing 438 provides cost tracking as resources are utilized within the cloud computing environment and billing for consumption of these resources. In one example, these resources may comprise application software licenses. Security of security and user portal 440 provides identity verification for cloud consumers and workloads, as well as protection for data and other resources. User portal of security and user portal 440 provides access to the cloud computing environment for cloud consumers and system administrators. Service level management 442 provides cloud computing resource allocation and management such that required service levels are met based on service level agreements. Virtual machine environment management 444 provides management of virtual machine migration from a failed source virtual machine environment to a target failover virtual machine environment.

Workloads layer 408 provides the functionality of the cloud computing environment. Example workloads and functions provided by workload layer 408 may include mapping and navigation 446, software development and lifecycle management 448, virtual classroom education delivery 450, data analytics processing 452, transaction processing 454, and recovering client workloads on target failover virtual machine environments using service level agreement-based resource allocation in the target failover virtual machine environments.

In the course of developing illustrative embodiments, it was discovered that if insufficient resource capacity exists in a failover virtual machine environment to restart all virtual machines corresponding to a client workload from a failed server, as is frequently the case when servers run at near-full capacity or over full capacity, all virtual machines of the client workload will not be restarted and the client may suffer loss of service. In other words, when insufficient resource capacity exists to restart an entire client workload, the entirety of the client workload cannot be restarted and client suffers service loss. In such as a situation, illustrative embodiments may systematically reduce the resources provided to elements (e.g., virtual machines) processing a client's workload to allow all the elements to operate in a resource constrained recovery environment.

In addition, at the time of client workload recovery, the workload's resource requirements may exceed those of steady state processing of the client workload by, for example, ten times. In such a situation, illustrative embodiments may temporarily provide the inflated number of resources during recovery processing of the client workload in order to meet service level agreement recovery time.

Thus, illustrative embodiments may provide a comprehensive restart priority order when restarting virtual machines corresponding to a client workload in the event of a failure of a server in a virtual environment. When restarting virtual machines on a failover server, illustrative embodiments may utilize a service level agreement-based resource reduction for the migrated virtual machines. This service level agreement-based resource reduction process may take into account information, such as available resource capacity in a failover environment, a service level agreement corresponding to each respective tier of a multi-tiered client workload that virtual machines belong to, and applications running on the virtual machines, and based on this information, may determine which resources in the target failover virtual machine environment to allocate to virtual machines corresponding to different service level agreement tiers. In the case of insufficient resource capacity at the target failover environment, illustrative embodiments determine the resource reduction rate for each set of virtual machines corresponding to a particular service level agreement tier.

Illustrative embodiments may migrate virtual machines corresponding to a particular client workload from a failed server to a failover server within a same data center or cloud or to a failover server in a different data center or cloud. Illustrative embodiments may utilize a management server to check the "heartbeat" of all servers in a virtual machine environment processing a set of one or more client workloads. At a loss of "heartbeat", the management server may restart virtual machines associated with the failed server on a set of one or more failover servers. The management server may generate a plan to migrate the virtual machines needing recovery to a set of one or more target virtual machine environments based on available resources of the different environments. The management server may take into account a number of resource metrics to determine a set of one or more target locations for migrating the effected virtual machines to. The resource metrics may include, for example, central processor unit capacity, memory capacity, storage capacity, network bandwidth capacity, storage bandwidth capacity, or any combination of these.

Illustrative embodiments utilize service level agreement information, or restart priority information obtained from a different source other than the service level agreement information, to determine the level of resource reduction scaling to apply to client workload recovery resources. This approach allows illustrative embodiments to reduce virtual machine resources, as compared to the original amount of virtual machine resources, when illustrative embodiments are to recover virtual machines on a different virtual machine environment. For example, illustrative embodiments may reduce resources to a set of virtual machines corresponding to a highest service level agreement tier by a minimum amount and may reduce resources to a set virtual machines corresponding to a lowest service level agreement tier by a maximum amount. In one illustrative embodiment, the resource reduction may be scaled down central processor unit requirements and memory requirements for a particular set of virtual machines corresponding to a particular service level agreement tier of a client workload. In another illustrative embodiment, a virtual machine in the set of particular set of virtual machines corresponding to the same particular service level agreement tier may receive a different scaled down set of resources based on properties of the target failover server and/or properties of the virtual machine. The failover server properties may include, for example: 1) whether the target failover server is in the same or remote data center or cloud; 2) the level of how committed or over-committed the target failover server is; and 3) architectural properties of the target failover server, such as server type. The virtual machine properties may include, for example: 1) service level agreement corresponding to the tier the virtual machine belongs to; and 2) virtual machine cluster organization in a data center or cloud (e.g., whether the virtual machine is active or passive in a cluster).

As an illustrative example, suppose there are four virtual machines having priorities of 1, 2, 3, and 4, with 1 being the highest priority. In addition, each virtual machine requires 100 units of resource (e.g., CPU units) for a total for 400 units of resource being required for failover. However, also suppose that the failover environment only has 300 units of CPU remaining to absorb this workload. In this situation, illustrative embodiments may allocate 100 units of CPU to the priority 1 virtual machine, 85 units of CPU to the priority 2 virtual machine, 65 units of CPU to the priority 3 virtual machine, and 50 units of CPU to the priority 4 virtual machine. This allocation assumes that the lower priority virtual machines can function properly, although at a lower performance level, with the reduced amount of CPU resource units. Also, it should be noted that this sliding reduction in resource allocation may occur in parallel for all the resources needed by all the virtual machines (e.g., CPU, memory, storage, network bandwidth, and storage bandwidth and not just a single resource).

When a server fails, illustrative embodiments utilize information about the virtual machines that were actively processing a client workload on the failed server. Each of these virtual machines has an assigned priority and a calculated priority, which together form a priority expectation for bidding. Based on the priority expectation of each of the virtual machines to recover, and on all other gathered information, illustrative embodiments determine the final restart priority and restart order for the virtual machines. Using this information, illustrative embodiments restart the virtual machines from the failed server on one or more failover servers in the restart order based on the final restart priority.

As a result, illustrative embodiments may allow reduction in resources at a disaster recovery site needed to achieve a given service level agreement for a multi-level service level agreement client workload. Alternatively, illustrative embodiments may provide better service level agreement compliance given a limited amount of resources in a failover environment. In addition, illustrative embodiments are intended to apply to recovery from any class of failures or faults that requires a client workload to be recovered on a failover environment (e.g., high availability environment or disaster recovery site).

Figure 5:
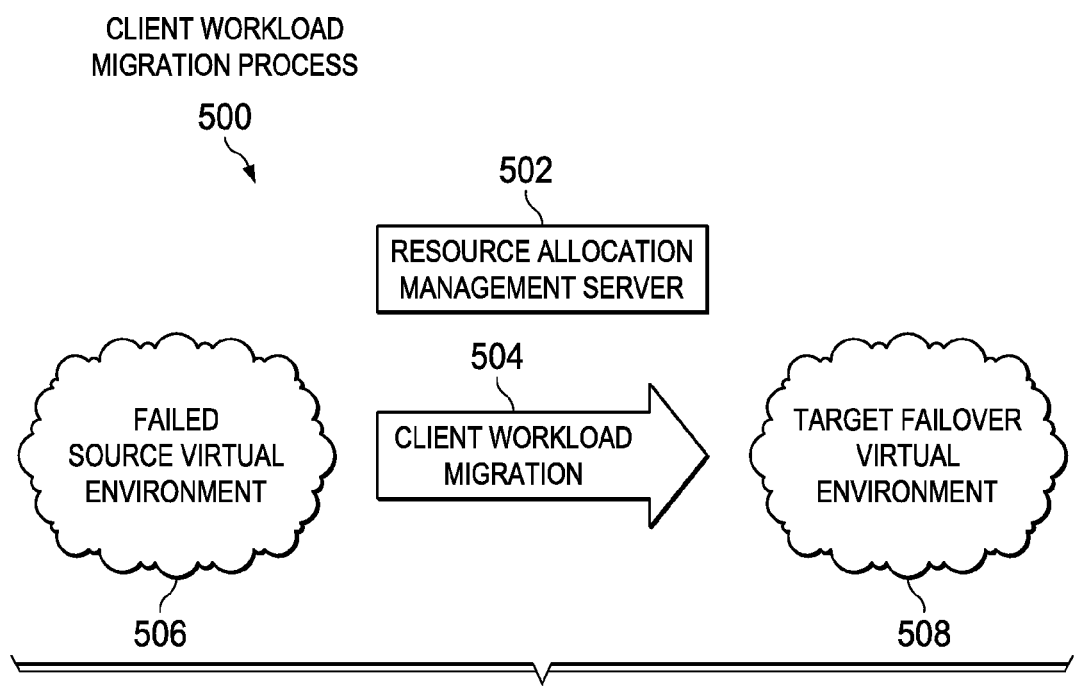
FIG. 5 is a diagram of an example of a client workload migration process in accordance with an illustrative embodiment.

With reference now to FIG. 5, a diagram of an example of a client workload migration process is depicted in accordance with an illustrative embodiment. Client workload migration process 500 may be implemented in a network of data processing systems, such as, for example, network data processing system 100 in FIG. 1 or a cloud computing environment, such as, for example, cloud computing environment 300 in FIG. 3. In addition, resource allocation management server 502 performs client workload migration process 500 by utilizing, for example, a resource allocation manager, such as, resource allocation manager 218 in data processing system 200 in FIG. 2. Resource allocation management server 502 may be, for example, data processing system 200 in FIG. 2 or one of cloud computing nodes 310 in FIG. 3.

During client workload migration process 500, resource allocation management server 502 performs client workload migration 504 from failed source virtual environment 506 to target failover virtual environment 508. Failed source virtual environment 506 may be, for example, client 110 in FIG. 1. Target failover virtual environment 508 may be, for example, client 112 in FIG. 1. The client workload may be, for example, client workload 222 in FIG. 2. However, it should be noted that client workload migration 504 may represent migration of a set of one or more client workloads with all corresponding virtual machine images.

Also during client workload migration process 500, resource allocation management server 502 may determine the number and type of available resources, such as available resources 228 in FIG. 2, in target failover virtual environment 508. Further, resource allocation management server 502 may determine a set of service level agreement tiers, such as set of service level agreement tiers 236 in FIG. 2, corresponding to the client workload being migrated at 504. Furthermore, resource allocation management server 502 may allocate resources in target failover virtual environment 508 to virtual machines corresponding to the client workload based on resource availability and service level agreement-based resource allocation to respective tiers in the set of service level agreement tiers corresponding to the client workload. Moreover, resource allocation management server 502 may reduce resource allocation to each respective tier in the set of service level agreement tiers when resource availability in target failover virtual environment 508 is insufficient to process the entire client workload based on service level agreement-based resource reduction rates per tier, such as service level agreement-based resource reduction rate per tier 238 in FIG. 2.

With reference now to FIG. 6, an example of a service level agreement tier chart is depicted in accordance with an illustrative embodiment. Service level agreement tier chart 600 classifies client business functions into different service level agreement tiers, such as service level agreement tiers 602. Illustrative embodiments may classify the business functions into the different tiers of service level agreement tiers 602 based on a business impact analysis of a particular client by utilizing information in business function characteristics 604, availability requirements 606, and recoverability requirements 608.

In this example, service level agreement tiers 602 include critical tier 610, essential tier 612, routine tier 614, and non-essential tier 616. However, illustrative embodiments are not limited to such. For example, illustrative embodiments may include more or fewer tiers than illustrated.

Also in this example, the business function characteristics 604, availability requirements 606, and recoverability requirements 608 for critical tier 610 are: mission critical applications (e.g., top 5-10% of business applications) that have a very high impact on a client's revenue and regulation compliance; have 99.999% availability or continuous availability; and have less than 5.26 minutes per year downtime. The business function characteristics 604, availability requirements 606, and recoverability requirements 608 for essential tier 612 are: business critical applications that have a high impact on a client's revenue and regulation compliance; have 99.99% availability or near-continuous availability; and have less than 52.56 minutes per year downtime. The business function characteristics 604, availability requirements 606, and recoverability requirements 608 for routine tier 614 are: back-office function applications; have 99.9% availability or high availability; and have less than 8.76 hours per year downtime. The business function characteristics 604, availability requirements 606, and recoverability requirements 608 for non-essential tier 616 are: non-critical, back-end, offline business function applications; have 99.5% or less availability or moderate or best effort availability; and have greater than 1.83 days per year downtime. However, it should be noted that all of these examples above are for illustration purposed only. Illustrative embodiments are not limited to such. Illustrative embodiments may utilize any type of criteria, information, or parameters to define the different tiers of service level agreement chart 600.

Figure 7:
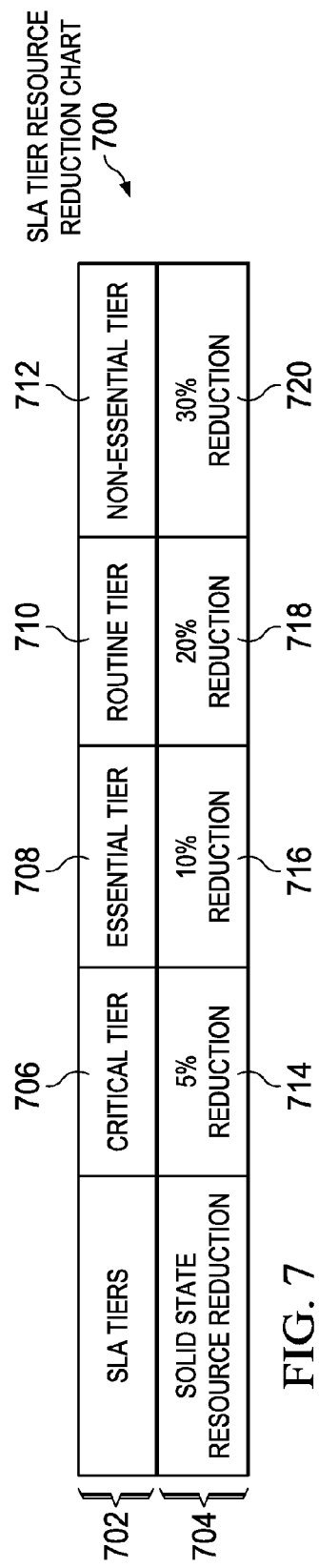
FIG. 7 is an example of a service level agreement tier resource reduction chart in accordance with an illustrative embodiment.

With reference now to FIG. 7, an example of a service level agreement tier resource reduction chart is depicted in accordance with an illustrative embodiment. Service level agreement tier resource reduction chart 700 may be implemented in a resource allocation manager, such as resource allocation manager 218 in FIG. 2. The resource allocation manager may utilize service level agreement tier resource reduction chart 700 to perform a service level agreement-based resource reduction to virtual machines corresponding to each tier of a multi-tiered client workload, such as service level agreement-based resource reduction rate per tier 238 in FIG. 2, when available resources at a target failover virtual machine environment are insufficient to process all of the virtual machines associated with the client workload being migrated to the target failover virtual machine environment. The target failover virtual machine environment may be, for example, target failover virtual environment 508 in FIG. 5.

In this example, service level agreement tier resource reduction chart 700 includes service level agreement tiers 702 and solid state resource reduction 704. Service level agreement tiers 702 define the different tiers corresponding to a multi-tiered client workload. Solid state resource reduction 704 defines an amount of resource reduction to respective tiers in service level agreement tiers 702 when resource availability is insufficient for steady state processing of the multi-tiered client workload.

When recovering virtual machines corresponding to a client workload on a resource-constrained failover environment, illustrative embodiments perform a service level agreement-based steady state resource reduction of the recovering virtual machines. In the case of insufficient resource capacity at the failover environment, illustrative embodiments determine the resource reduction for each set of virtual machines based on the service level agreement corresponding to a particular tier that a particular set of virtual machines belongs to. In other words, illustrative embodiments may utilize service level agreement tier resource reduction chart 700 to determine the amount of resource reduction to each particular tier in service level agreement tiers 702.

Service level agreement tiers 702 include critical tier 706, essential tier 708, routine tier 710, and non-essential tier 712, such as critical tier 610, essential tier 612, routine tier 614, and non-essential tier 616 in FIG. 6. Also in this example, solid state resource reduction 704 defines a 5% reduction 714 for critical tier 706, a 10% reduction 716 for essential tier 708, a 20% reduction 718 for routine tier 710, and a 30% reduction 720 for non-essential tier 712. However, it should be noted that all of these examples above are for illustration purposed only. Illustrative embodiments are not limited to such. Illustrative embodiments may utilize any percentage amount of resource reduction to individual tiers in service level agreement tiers 702. For example, illustrative embodiments may define a 0% resource reduction to virtual machines corresponding to critical tier 706.

Figure 8:
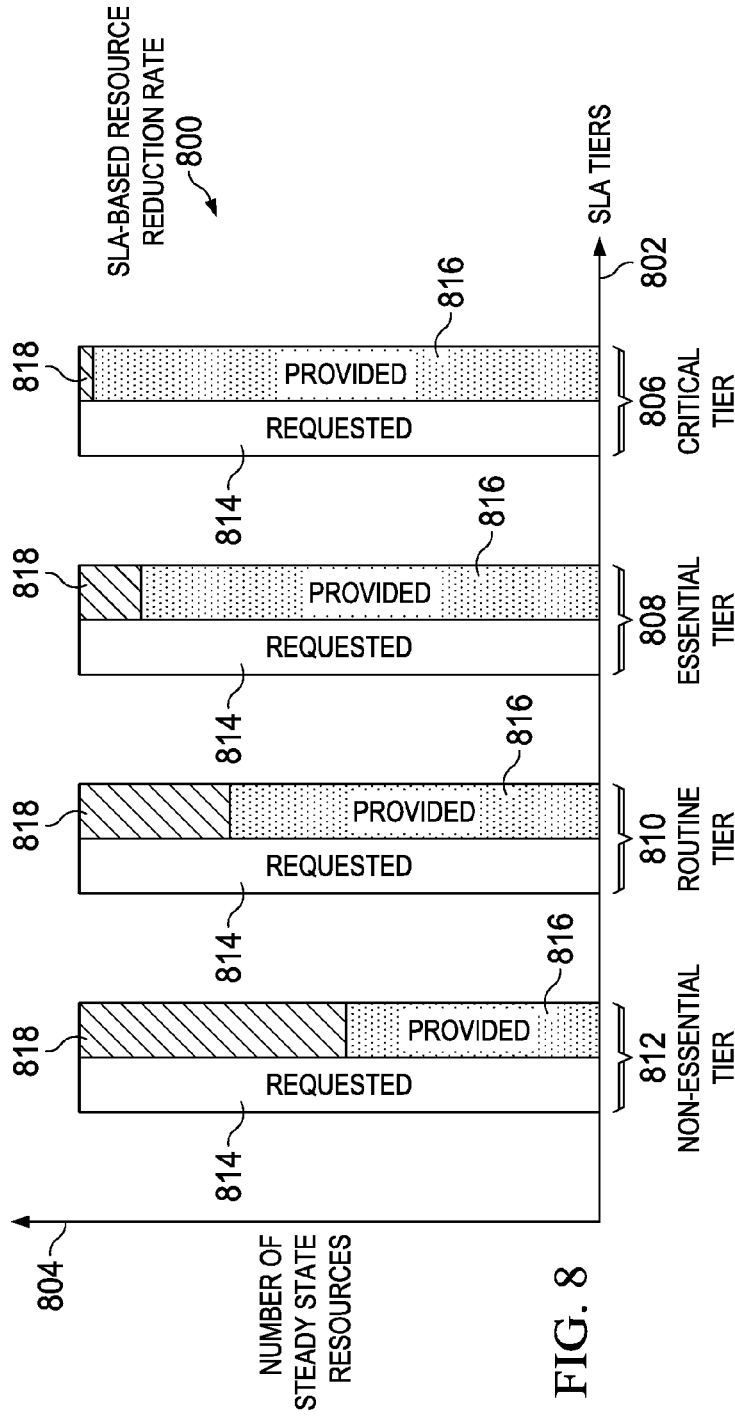
FIG. 8 is an example of a service level agreement-based resource reduction rate in accordance with an illustrative embodiment.

With reference now to FIG. 8, an example of a service level agreement-based resource reduction rate is depicted in accordance with an illustrative embodiment. Service level agreement-based resource reduction rate 800 is a graphic representation of a static allocation of recovery resources versus a service level agreement-based allocation of recovery resources. Service level agreement-based resource reduction rate 800 comprises service level agreement tiers 802 axis and number of steady state resources 804 axis. Service level agreement tiers 802 may be, for example, service level agreement tiers 702 in FIG. 7. Service level agreement tiers 802 include critical tier 806, essential tier 808, routine tier 810, and non-essential tier 812. Number of steady state resources 804 represents the number of available resources in a failover virtual environment to recover virtual machines corresponding to a client workload.

Requested 814 represents a number of resources requested by a particular tier to recover a set of virtual machines corresponding to that particular tier. Provided 816 represents a number of resources provided to a particular tier based on a service level agreement corresponding to that particular tier. Reduction 818 represents the amount of resource reduction to each particular tier in service level agreement tiers 802. In other words, reduction 818 is a function of an overall shortfall of resources between requested 814 and provided 816 and a service level agreement-based resource reduction rate. Reduction 818 for critical tier 806, essential tier 808, routine tier 810, and non-essential tier 812 may be, for example, a 5% reduction, a 10% reduction, a 20% reduction, and a 30% reduction, respectively, similar to the tier rate reductions illustrated in the example of FIG. 7.

Figure 9:
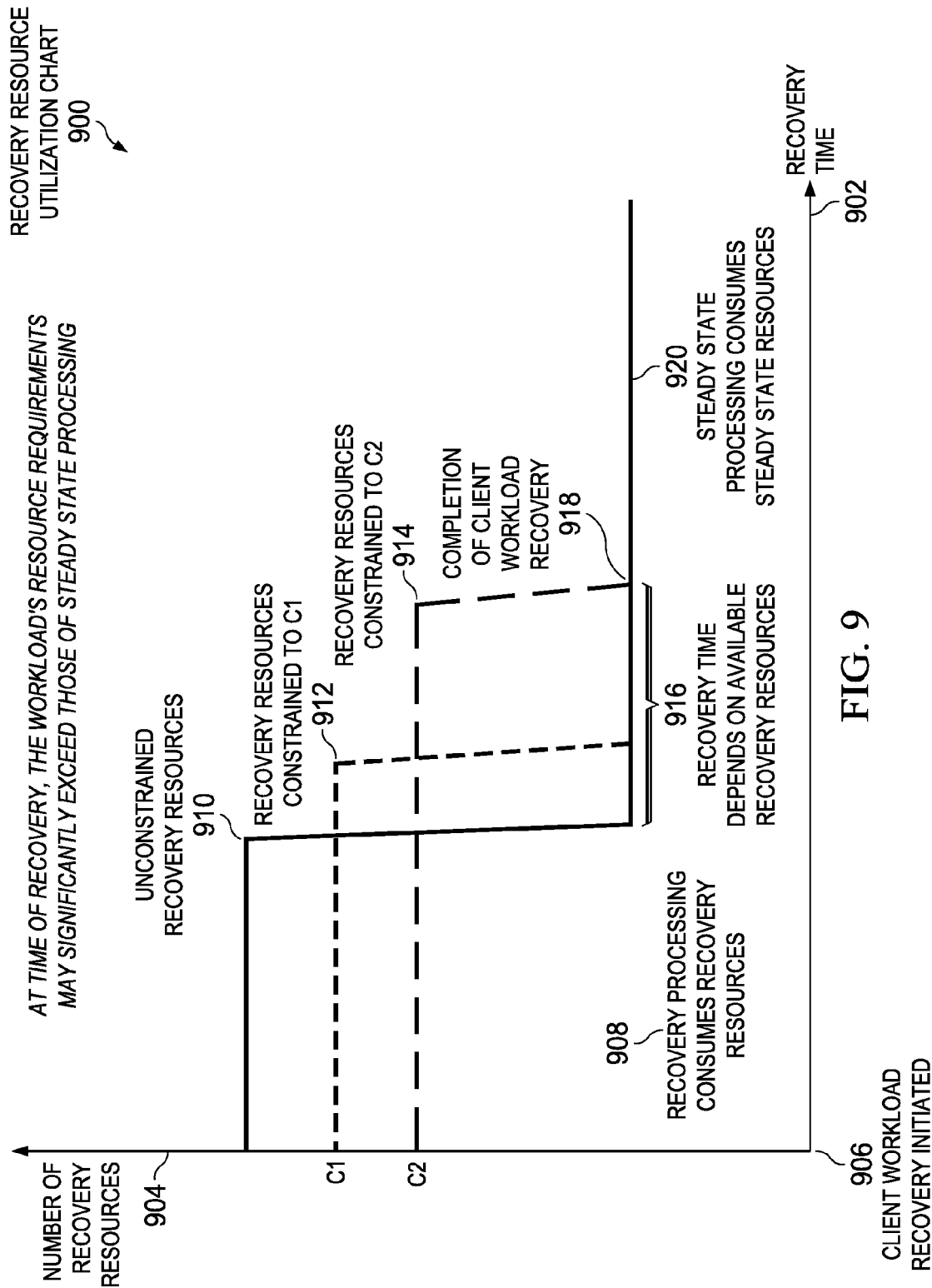
FIG. 9 is an example of a recovery resource utilization chart in accordance with an illustrative embodiment.

With reference now to FIG. 9, an example of a recovery resource utilization chart is depicted in accordance with an illustrative embodiment. Recovery resource utilization chart 900 illustrates that, at time of recovery, a client workload's resource requirements may exceed those of steady state processing of the client workload. Recovery resource utilization chart 900 comprises recovery time 902 axis and number of recovery resources 904 axis. Recovery time 902 represents the amount of time required to recover different tiers of the client workload to steady state processing. Number of recovery resources 904 represents the amount of recovery resources allocated to each of the different tiers of the client workload. The recovery resources may be, for example, recovery resources 230 in FIG. 2.

Client workload recovery is initiated at 906. Recovery processing of the multi-tiered client workload consumes recovery resources at 908. Unconstrained recovery resources 910 may represent a number of recovery resources allocated to a critical service level agreement tier, for example. Recovery resources constrained to C1 912 may represent a number of recovery resources allocated to an essential service level agreement tier, for example. Recovery resources constrained to C2 914 may represent a number of recovery resources allocated to a routine service level agreement tier, for example.

Recovery time for the different tiers of the client workload to achieve steady state processing depends on available recovery resources at 916. For example, the tier corresponding to unconstrained recovery resources 910 achieves steady state processing first, the tier corresponding to recover resources constrained to C1 912 achieves steady state processing next, and the tier corresponding to recover resources constrained to C2 914 achieves steady state processing last. Completion of client workload recovery to steady state processing occurs at 918. Steady state processing of the client workload consumes steady state resources at 920. The steady state resources may be, for example, steady state resources 232 in FIG. 2.

Figure 10:
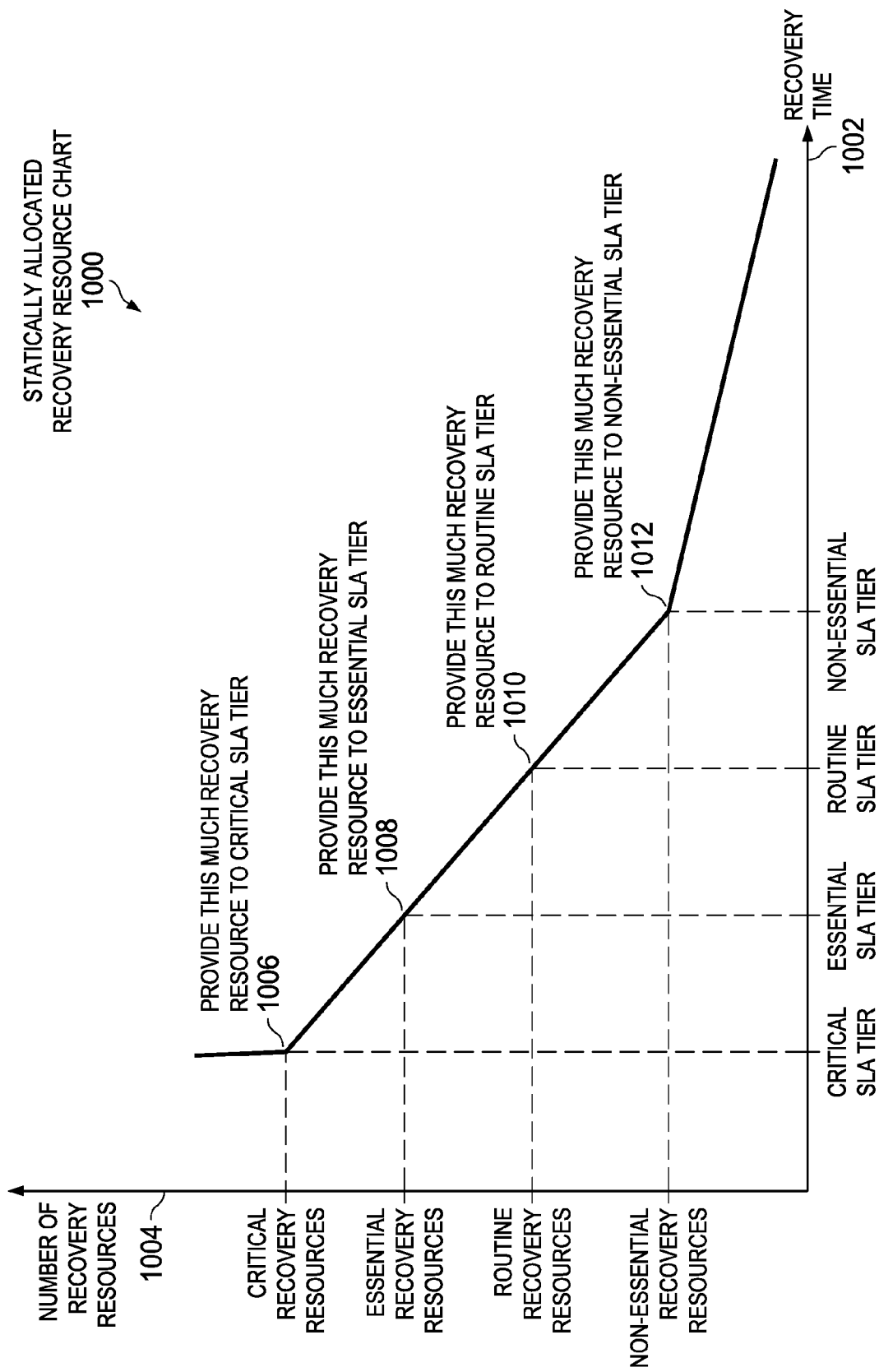
FIG. 10 is an example of a statically allocated recovery resource chart in accordance with an illustrative embodiment.

With reference now to FIG. 10, an example of a statically allocated recovery resource chart is depicted in accordance with an illustrative embodiment. Statically allocated recovery resource chart 1000 illustrates the number of recovery resources allocated to each service level agreement tier in order to meet service level agreement-defined recovery time for each respective tier. Statically allocated recovery resource chart 1000 also illustrates the release of recovery resources for steady state processing after recovering all tiers is completed. Illustrative embodiments may allocate the recovery resources to each respective tier in parallel because sufficient recovery resources exist in a target failover virtual machine environment.

Statically allocated recovery resource chart 1000 comprises recovery time 1002 axis and number of recovery resources 1004 axis. Recovery time 1002 axis and number of recovery resources 1004 axis may be, for example, recovery time 902 axis and number of recovery resources 904 axis in FIG. 9.

In this example, illustrative embodiments provide this much recovery resources to a critical service level tier at 1006. This number of critical recovery resources allocated to the critical service level tier is the largest number of recovery resources allocated, which allows the critical service level agreement tier to recover first in time or the fastest of all the tiers. Illustrative embodiments provide this much recovery resources to an essential service level tier at 1008. This number of essential recovery resources allocated to the essential service level tier is the second largest number of recovery resources allocated, which allows the essential service level agreement tier to recover second in time. Illustrative embodiments provide this much recovery resources to a routine service level tier at 1010. This number of routine recovery resources allocated to the routine service level tier is the third largest number of recovery resources allocated, which allows the routine service level agreement tier to recover third in time. Illustrative embodiments provide this much recovery resources to a non-essential service level tier at 1012. This number of non-essential recovery resources allocated to the non-essential service level tier is the least number of recovery resources allocated, which allows the non-essential service level agreement tier to recover last in time or the slowest of all the tiers.

Figure 11:
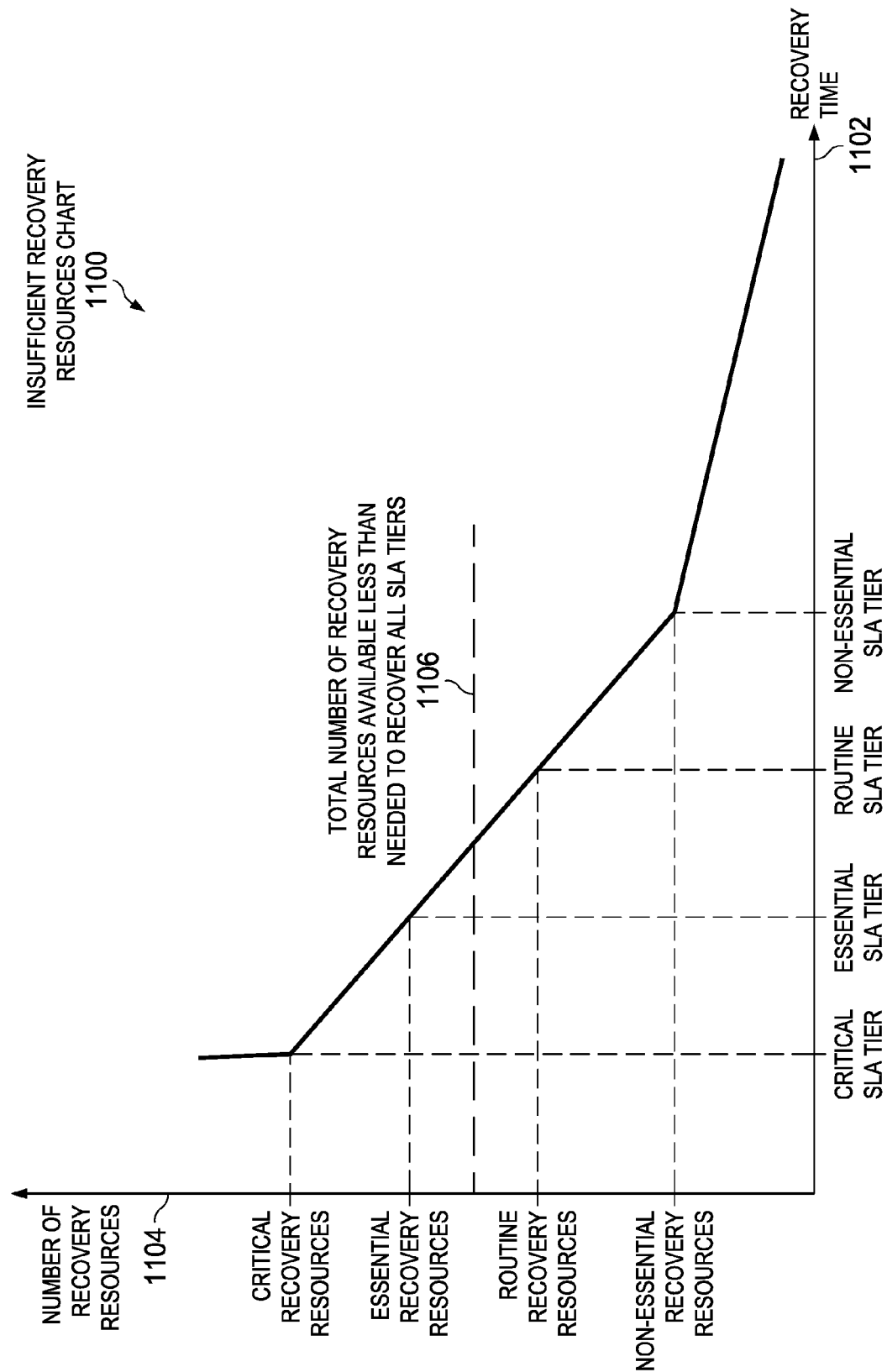
FIG. 11 is an example of an insufficient recovery resources chart in accordance with an illustrative embodiment.

With reference now to FIG. 11, an example of an insufficient recovery resources chart is depicted in accordance with an illustrative embodiment. Insufficient recovery resources chart 1100 comprises recovery time 1102 axis and number of recovery resources 1104 axis, such as recovery time 1002 axis and number of recovery resources 1004 axis in FIG. 10. Insufficient recovery resources chart 1100 illustrates that the total number of recovery resources available is less than what is needed to recover all virtual machines corresponding to different service level agreement tiers corresponding to a client workload at 1106.

Figure 12:
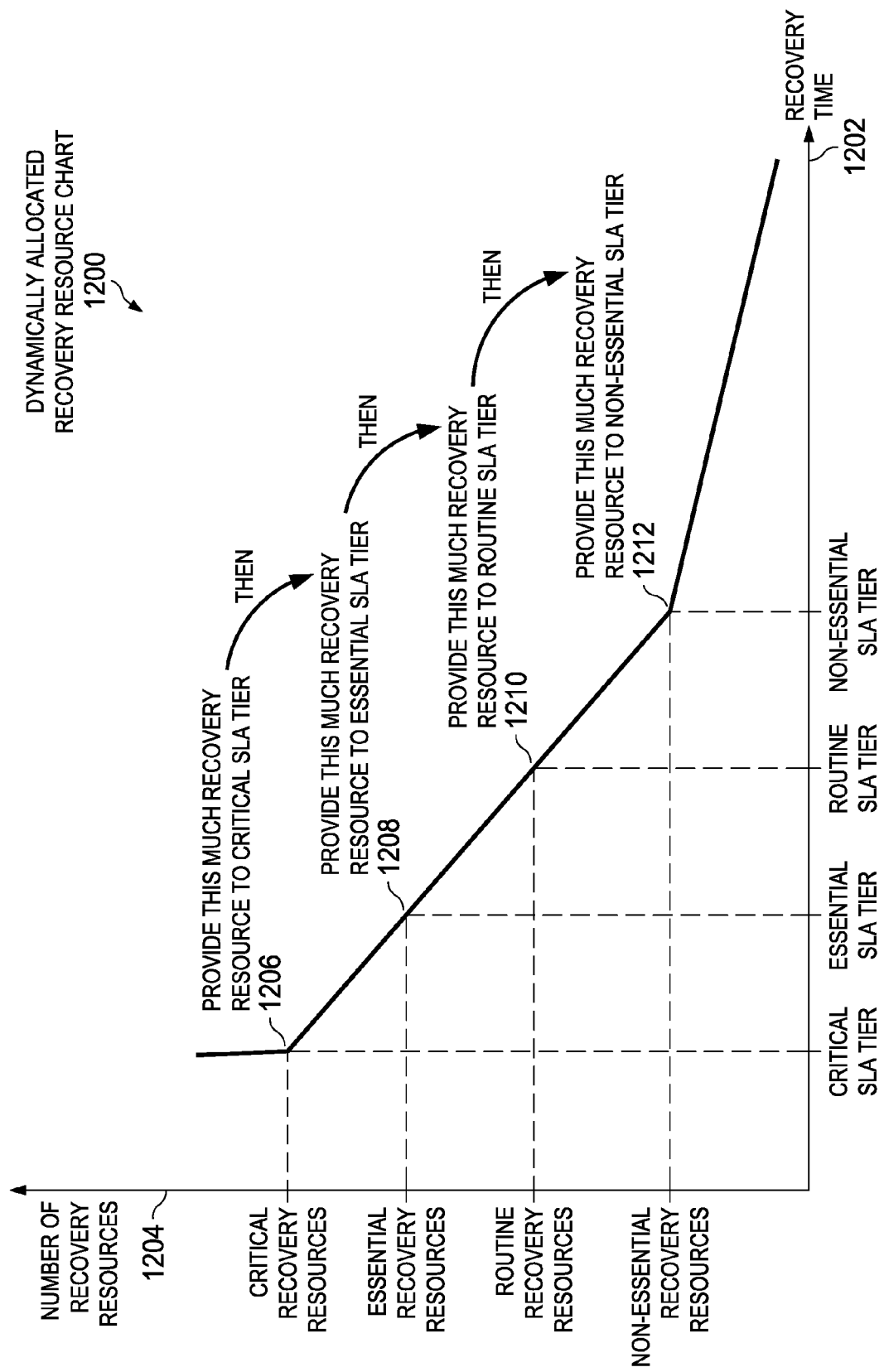
FIG. 12 is an example of a dynamically allocated recovery resource chart in accordance with an illustrative embodiment.

With reference now to FIG. 12, an example of a dynamically allocated recovery resource chart is depicted in accordance with an illustrative embodiment. Dynamically allocated recovery resource chart 1200 illustrates how illustrative embodiments respond to a situation where not enough recovery resources are available in a target failover virtual machine environment to recover all virtual machines corresponding to different service level agreement tiers of a client workload. In this situation, illustrative embodiments sequentially or serially allocate recovery resource to the different service level agreement tiers of the client workload. In other words, illustrative embodiments may ripple recovery resources through the different service level agreement tiers in priority order. It should be noted that illustrative embodiments add recovery resources to each later tier to account for a later recovery start time to each subsequent tier recovery process.

Dynamically allocated recovery resource chart 1200 comprises recover time 1202 axis and number of recovery resources 1204 axis, such as recover time 1002 axis and number of recovery resources 1004 axis in FIG. 10. Illustrative embodiments provide this much recovery resources to a critical service level agreement tier at 1206. Then, illustrative embodiments provide this much recovery resources to an essential service level agreement tier, which comprises critical recovery resources released to the essential recovery resources, at 1208. Then, illustrative embodiments provide this much recovery resources to a routine service level agreement tier, which comprises essential recovery resources released to the routine recovery resources, at 1210. Then, illustrative embodiments provide this much recovery resources to a non-essential service level agreement tier, which comprises routine recovery resources released to the non-essential recovery resources, at 1212. Afterward, illustrative embodiments may release the recovery resources to a steady state processing pool of resources when client workload recovery is completed in the target failover virtual machine environment.

Figure 13:
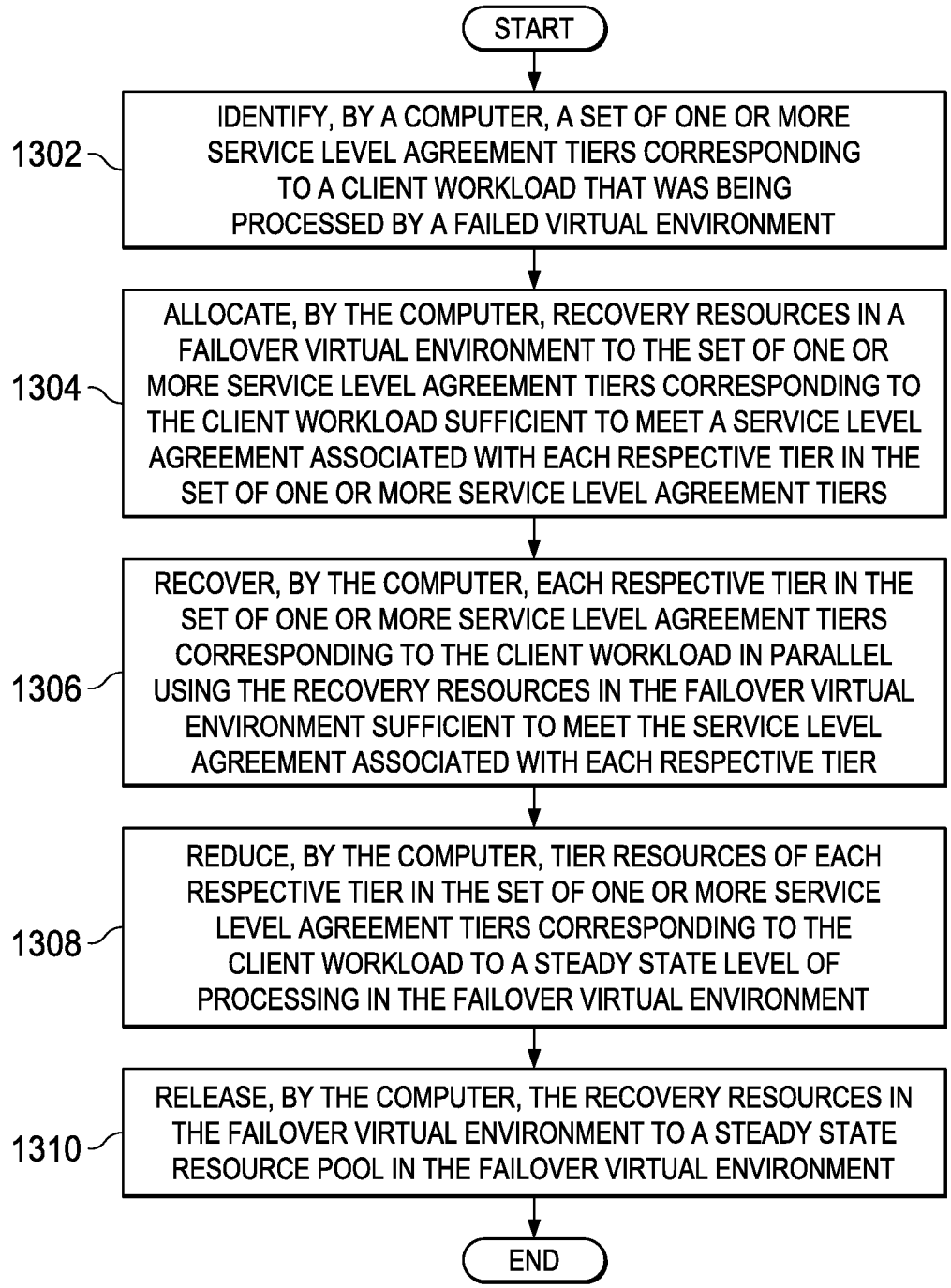
FIG. 13 is a flowchart illustrating a process for statically allocating recovery resources to a failed client workload in accordance with an illustrative embodiment.

With reference now to FIG. 13, a flowchart illustrating a process for statically allocating recovery resources to a failed client workload is shown in accordance with an illustrative embodiment. The process shown in FIG. 13 may be implemented in a computer, such as, for example, server 104 in FIG. 1 and data processing system 200 in FIG. 2.

The process begins when the computer identifies a set of one or more service level agreement tiers corresponding to a client workload that was being processed by a failed virtual environment (step 1302). The computer allocates recovery resources in a failover virtual environment to the set of one or more service level agreement tiers corresponding to the client workload sufficient to meet a service level agreement associated with each respective tier in the set of one or more service level agreement tiers (step 1304). The computer recovers each respective tier in the set of one or more service level agreement tiers corresponding to the client workload in parallel using the recovery resources in the failover virtual environment sufficient to meet the service level agreement associated with each respective tier (step 1306).

In response to the computer recovering each respective tier in step 1306, the computer reduces tier resources of each respective tier in the set of one or more service level agreement tiers corresponding to the client workload to a steady state level of processing in the failover virtual environment (step 1308). In addition, the computer releases the recovery resources in the failover virtual environment to a steady state resource pool in the failover virtual environment (step 1310). Thereafter, the process terminates.

Figure 14:
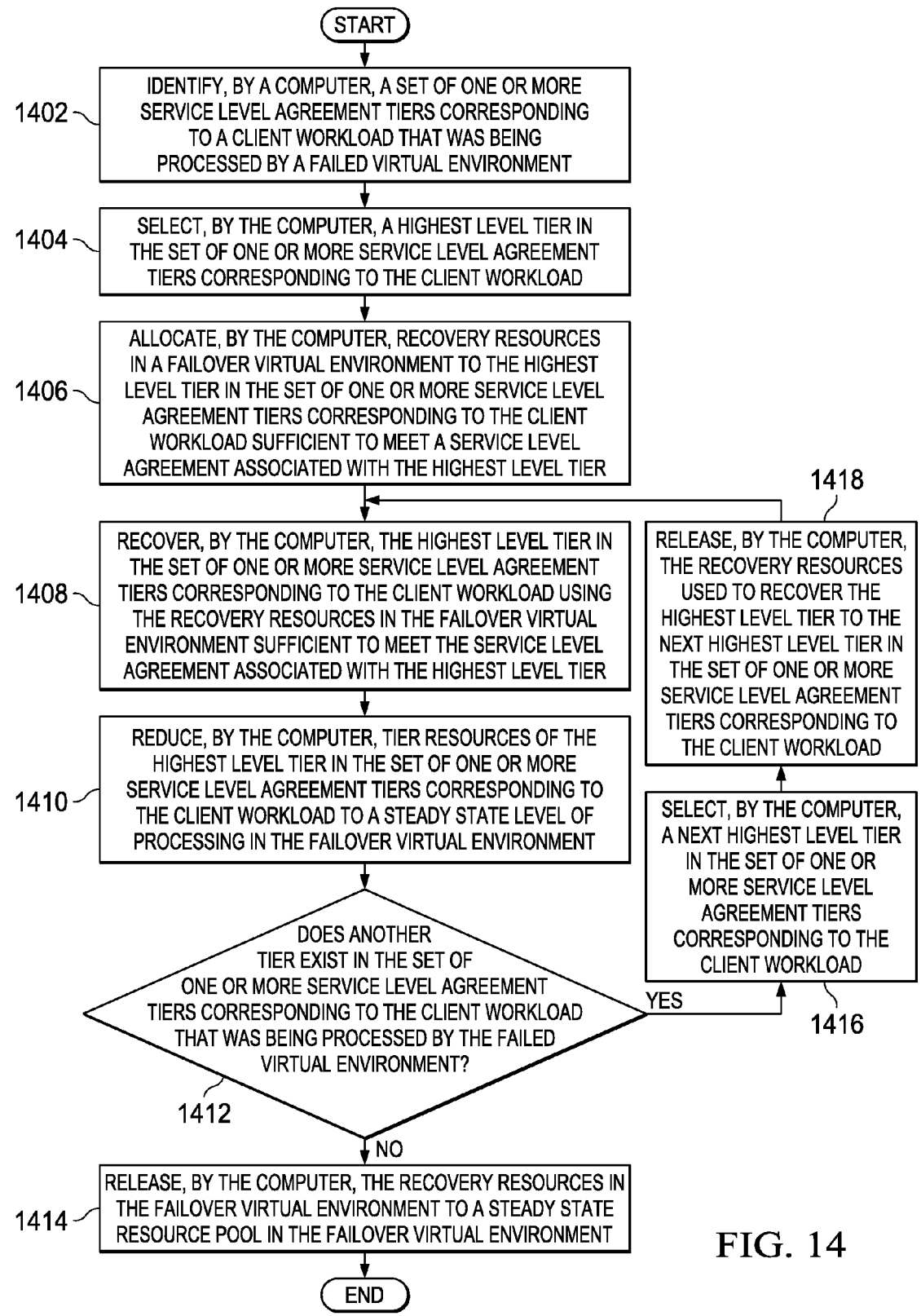
FIG. 14 is a flowchart illustrating a process for dynamically allocating recovery resources to a failed client workload in accordance with an illustrative embodiment.

With reference now to FIG. 14, a flowchart illustrating a process for dynamically allocating recovery resources to a failed client workload is shown in accordance with an illustrative embodiment. The process shown in FIG. 14 may be implemented in a computer, such as, for example, server 104 in FIG. 1 and data processing system 200 in FIG. 2.

The process begins when the computer identifies a set of one or more service level agreement tiers corresponding to a client workload that was being processed by a failed virtual environment (step 1402). The computer also selects a highest level tier in the set of one or more service level agreement tiers corresponding to the client workload (step 1404). In addition, the computer allocates recovery resources in a failover virtual environment to the highest level tier in the set of one or more service level agreement tiers corresponding to the client workload sufficient to meet a service level agreement associated with the highest level tier (step 1406).

Subsequently, the computer recovers the highest level tier in the set of one or more service level agreement tiers corresponding to the client workload using the recovery resources in the failover virtual environment sufficient to meet the service level agreement associated with the highest level tier (step 1408). In response to the computer recovering the highest level tier in step 1408, the computer reduces tier resources of the highest level tier in the set of one or more service level agreement tiers corresponding to the client workload to a steady state level of processing in the failover virtual environment (step 1410). Afterward, the computer makes a determination as to whether another tier exists in the set of one or more service level agreement tiers corresponding to the client workload that was being processed by the failed virtual environment (step 1412).

If the computer determines that another tier does not exist in the set of one or more service level agreement tiers corresponding to the client workload that was being processed by the failed virtual environment, no output of step 1412, then the computer releases the recovery resources in the failover virtual environment to a steady state resource pool in the failover virtual environment (step 1414) and the process terminates thereafter. If the computer determines that another tier does exist in the set of one or more service level agreement tiers corresponding to the client workload that was being processed by the failed virtual environment, yes output of step 1412, then the computer selects a next highest level tier in the set of one or more service level agreement tiers corresponding to the client workload (step 1416). In addition, the computer releases the recovery resources used to recover the highest level tier to the next highest level tier in the set of one or more service level agreement tiers corresponding to the client workload (step 1418). Thereafter, the process returns to step 1408 where the computer recovers the next highest level tier using the recovery resources released from the recovered highest level tier.

It should be note that if sufficient recovery resources exist to recover multiple tiers in parallel, then alternative illustrative embodiments may parallelize the process of FIG. 14. Parallelism also may exist with the recovery of each tier.

Thus, illustrative embodiments of the present invention provide a computer-implemented method, computer system, and computer program product for allocating resources during failure recovery. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should be also noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for allocating resources during failure recovery, the computer-implemented method comprising:
   identifying, by a computer, a set of one or more service level agreement tiers corresponding to a client workload that was being processed by a failed computing environment;
   selecting, by the computer, a highest level tier in the set of one or more service level agreement tiers corresponding to the client workload;
   allocating, by the computer, recovery resources in a failover computing environment to the highest level tier in the set of one or more service level agreement tiers corresponding to the client workload sufficient to meet a service level agreement associated with the highest level tier;
   recovering, by the computer, the highest level tier in the set of one or more service level agreement tiers corresponding to the client workload using the recovery resources in the failover computing environment sufficient to meet the service level agreement associated with the highest level tier;
   responsive to the computer recovering the highest level tier, reducing, by the computer, tier resources of the highest level tier in the set of one or more service level agreement tiers corresponding to the client workload to a steady state level of processing in the failover computing environment;
   determining, by the computer, whether another tier exists in the set of one or more service level agreement tiers corresponding to the client workload that was being processed by the failed computing environment; and
   responsive to the computer determining that another tier does not exist in the set of one or more service level agreement tiers corresponding to the client workload that was being processed by the failed computing environment, releasing, by the computer, the recovery resources in the failover computing environment to a steady state resource pool in the failover computing environment.

2. The computer-implemented method of claim 1 further comprising:
   selecting, by the computer, a next highest level tier in the set of one or more service level agreement tiers corresponding to the client workload; and
   releasing, by the computer, the recovery resources used to recover the highest level tier to the next highest level tier in the set of one or more service level agreement tiers corresponding to the client workload.

3. The computer-implemented method of claim 1 further comprising:
   allocating, by the computer, the recovery resources in the failover computing environment to the set of one or more service level agreement tiers corresponding to the client workload sufficient to meet a service level agreement associated with each respective tier in the set of one or more service level agreement tiers; and
   recovering, by the computer, each respective tier in the set of one or more service level agreement tiers corresponding to the client workload in parallel using the recovery resources in the failover computing environment sufficient to meet the service level agreement associated with each respective tier.

4. The computer-implemented method of claim 1, wherein the set of one or more service level agreement tiers includes a critical service level agreement tier, an essential service level agreement tier, a routine service level agreement tier, and a non-essential service level agreement tier.

5. The computer-implemented method of claim 4, wherein the critical service level agreement tier is the highest level tier, and wherein the essential service level agreement tier is a next highest level tier, and wherein the routine service level agreement tier is a third highest level tier, and wherein the non-essential service level agreement tier is a lowest level tier.

6. The computer-implemented method of claim 4, wherein each tier in the set of one or more service level agreement tiers has a corresponding service level agreement-based resource reduction rate.

7. The computer-implemented method of claim 6, wherein the critical service level agreement tier has a corresponding 5% service level agreement-based resource reduction rate, the essential service level agreement tier has a corresponding 10% service level agreement-based resource reduction rate, the routine service level agreement tier has a corresponding 20% service level agreement-based resource reduction rate, and the non-essential service level agreement tier has a corresponding 30% service level agreement-based resource reduction rate.

8. The computer-implemented method of claim 1, wherein each tier in the set of one or more service level agreement tiers includes a set of one or more virtual machines that executes a portion of the client workload.

9. The computer-implemented method of claim 1, wherein the failover computing environment includes available recovery resources and available steady state resources.

10. The computer-implemented method of claim 9, wherein the available recovery resources are in excess of the available steady state resources and are used in recovery of the client workload, and wherein the available steady state resources are used for steady state processing of the client workload on the failover computing environment after recovery of each tier in the set of one or more service level agreement tiers corresponding to the client workload.

11. The computer-implemented method of claim 1, wherein the recovery resources include at least one of central processor unit capacity, memory capacity, storage capacity, network bandwidth capacity, and storage bandwidth capacity.

12. A computer system for allocating resources during failure recovery, the computer system comprising:
   a bus system;
   a storage device connected to the bus system, wherein the storage device stores program instructions; and
   a processor connected to the bus system, wherein the processor executes the program instructions to:
      identify a set of one or more service level agreement tiers corresponding to a client workload that was being processed by a failed computing environment;
      select a highest level tier in the set of one or more service level agreement tiers corresponding to the client workload;
      allocate recovery resources in a failover computing environment to the highest level tier in the set of one or more service level agreement tiers corresponding to the client workload sufficient to meet a service level agreement associated with the highest level tier;
      recover the highest level tier in the set of one or more service level agreement tiers corresponding to the client workload using the recovery resources in the failover computing environment sufficient to meet the service level agreement associated with the highest level tier;
      reduce tier resources of the highest level tier in the set of one or more service level agreement tiers corresponding to the client workload to a steady state level of processing in the failover computing environment in response to recovering the highest level tier;
      determine, whether another tier exists in the set of one or more service level agreement tiers corresponding to the client workload that was being processed by the failed computing environment; and
      release the recovery resources in the failover computing environment to a steady state resource pool in the failover computing environment in response to determining that another tier does not exist in the set of one or more service level agreement tiers corresponding to the client workload that was being processed by the failed computing environment.

13. The computer system of claim 12, wherein the processor further executes the program instructions to: select a next highest level tier in the set of one or more service level agreement tiers corresponding to the client workload; and release the recovery resources used to recover the highest level tier to the next highest level tier in the set of one or more service level agreement tiers corresponding to the client workload.

14. A computer program product for allocating resources during failure recovery, the computer program product comprising a computer readable storage medium having program instructions embodied therewith, the program instructions executable by a computer to cause the computer to perform a method comprising:
   identifying, by the computer, a set of one or more service level agreement tiers corresponding to a client workload that was being processed by a failed computing environment;
   selecting, by the computer, a highest level tier in the set of one or more service level agreement tiers corresponding to the client workload;
   allocating, by the computer, recovery resources in a failover computing environment to the highest level tier in the set of one or more service level agreement tiers corresponding to the client workload sufficient to meet a service level agreement associated with the highest level tier;
   recovering, by the computer, the highest level tier in the set of one or more service level agreement tiers corresponding to the client workload using the recovery resources in the failover computing environment sufficient to meet the service level agreement associated with the highest level tier;
   responsive to the computer recovering the highest level tier, reducing, by the computer, tier resources of the highest level tier in the set of one or more service level agreement tiers corresponding to the client workload to a steady state level of processing in the failover computing environment;
   determining, by the computer, whether another tier exists in the set of one or more service level agreement tiers corresponding to the client workload that was being processed by the failed computing environment; and
   responsive to the computer determining that another tier does not exist in the set of one or more service level agreement tiers corresponding to the client workload that was being processed by the failed computing environment, releasing, by the computer, the recovery resources in the failover computing environment to a steady state resource pool in the failover computing environment.

15. The computer program product of claim 14 further comprising:
   selecting, by the computer, a next highest level tier in the set of one or more service level agreement tiers corresponding to the client workload; and
   releasing, by the computer, the recovery resources used to recover the highest level tier to the next highest level tier in the set of one or more service level agreement tiers corresponding to the client workload.

16. The computer program product of claim 14 further comprising:
   allocating, by the computer, the recovery resources in the failover computing environment to the set of one or more service level agreement tiers corresponding to the client workload sufficient to meet a service level agreement associated with each respective tier in the set of one or more service level agreement tiers; and
   recovering, by the computer, each respective tier in the set of one or more service level agreement tiers corresponding to the client workload in parallel using the recovery resources in the failover computing environment sufficient to meet the service level agreement associated with each respective tier.

17. The computer program product of claim 14, wherein the set of one or more service level agreement tiers includes a critical service level agreement tier, an essential service level agreement tier, a routine service level agreement tier, and a non-essential service level agreement tier.

18. The computer program product of claim 17, wherein the critical service level agreement tier is the highest level tier, and wherein the essential service level agreement tier is a next highest level tier, and wherein the routine service level agreement tier is a third highest level tier, and wherein the non-essential service level agreement tier is a lowest level tier.

19. The computer program product of claim 17, wherein each tier in the set of one or more service level agreement tiers has a corresponding service level agreement-based resource reduction rate.

20. The computer program product of claim 19, wherein the critical service level agreement tier has a corresponding 5% service level agreement-based resource reduction rate, the essential service level agreement tier has a corresponding 10% service level agreement-based resource reduction rate, the routine service level agreement tier has a corresponding 20% service level agreement-based resource reduction rate, and the non-essential service level agreement tier has a corresponding 30% service level agreement-based resource reduction rate.

* * * * *